(12) United States Patent
Yamaguchi et al.

(10) Patent No.: US 9,164,245 B2
(45) Date of Patent: Oct. 20, 2015

(54) OPTICAL CONNECTOR

(75) Inventors: Takashi Yamaguchi, Sakura (JP); Kazuhiro Takizawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 391 days.

(21) Appl. No.: 13/454,611

(22) Filed: Apr. 24, 2012

(65) Prior Publication Data
US 2012/0275748 A1 Nov. 1, 2012

(30) Foreign Application Priority Data
Apr. 26, 2011 (JP) ................................. 2011-098383

(51) Int. Cl.
*G02B 6/255* (2006.01)
*G02B 6/38* (2006.01)

(52) U.S. Cl.
CPC ............ *G02B 6/3858* (2013.01); *G02B 6/2555* (2013.01); *G02B 6/2558* (2013.01); *G02B 6/255* (2013.01); *G02B 6/3846* (2013.01)

(58) Field of Classification Search
None
See application file for complete search history.

(56) References Cited

U.S. PATENT DOCUMENTS

| | | | | |
|---|---|---|---|---|
| 6,848,837 B2* | 2/2005 | Gilligan | ..................... | 385/80 |
| 7,192,194 B2* | 3/2007 | Giotto et al. | ..................... | 385/53 |
| 7,258,496 B2* | 8/2007 | Saito et al. | ..................... | 385/98 |
| 7,264,410 B1* | 9/2007 | Doss et al. | ..................... | 385/95 |
| 7,572,064 B2* | 8/2009 | deJong | ..................... | 385/65 |
| 7,658,553 B2* | 2/2010 | Semmler et al. | ............... | 385/98 |
| 8,111,956 B2* | 2/2012 | Tan et al. | .................... | 385/24 |
| 8,550,728 B2* | 10/2013 | Takahashi et al. | ............... | 385/99 |
| 2007/0147741 A1 | 6/2007 | Meek et al. | | |
| 2007/0274657 A1* | 11/2007 | Billman et al. | ............... | 385/134 |
| 2009/0317074 A1* | 12/2009 | Tan et al. | .................... | 398/20 |

FOREIGN PATENT DOCUMENTS

| | | |
|---|---|---|
| JP | 09-127371 A | 5/1997 |
| JP | 10-206688 A | 8/1998 |
| JP | 11-344625 A | 12/1999 |
| JP | 2004252159 A | 9/2004 |
| JP | 2005-208220 A | 8/2005 |
| JP | 2007-183383 A | 7/2007 |

(Continued)

OTHER PUBLICATIONS

Communication dated Aug. 19, 2014, issued by the Japanese Intellectual Property Office in counterpart Japanese Application No. 2011-098383.

(Continued)

*Primary Examiner* — Uyen Chau N Le
*Assistant Examiner* — John M Bedtelyon
(74) *Attorney, Agent, or Firm* — Sughrue Mion, PLLC

(57) ABSTRACT

The present invention relates to an optical connector including, a ferrule within which an integrated optical fiber is fixed, a clamp portion disposed at a rear of the ferrule, the clamp portion comprising: a base component and a lid component facing the based component, where the base component and the lid component together are configured to clamp an end portion of the integrated optical fiber and an end portion of a naked optical fiber abutting the end portion of the integrated optical fiber, and a naked optical fiber guide portion disposed at a rear of the clamp portion, where the naked optical fiber guide portion comprises a through hole through which the naked optical fiber can be inserted, and that guides the naked optical fiber to the clamp portion by the through hole.

6 Claims, 8 Drawing Sheets

(56) References Cited

FOREIGN PATENT DOCUMENTS

| | | |
|---|---|---|
| JP | 2007-264018 A | 10/2007 |
| JP | 2008-309893 A | 12/2008 |
| JP | 2010-134098 A | 6/2010 |
| JP | 2012-14159 A | 1/2012 |
| JP | 2012-145737 A | 8/2012 |

OTHER PUBLICATIONS

Communication dated May 27, 2014, from the Japanese Patent Office in a counterpart Japanese Application No. 2011-098383.
Communication dated Dec. 2, 2014, issued by the Japan Patent Office in corresponding Japanese Application No. 2011-098383.

* cited by examiner

OPTICAL CONNECTOR

CROSS REFERENCE TO RELATED APPLICATIONS

Priority is claimed on Japanese Patent Application No. 2011-098383, filed Apr. 26, 2011, the contents of which are incorporated herein by reference.

BACKGROUND OF THE INVENTION

1. Field of the Invention

The present invention relates to a field assembly optical connector that connects an optical fiber end-on to a rear end of an integrated optical fiber which is inserted into a ferrule and fixed therein, and that is capable of being assembled together with the optical fiber.

2. Description of Related Art

When optical fiber core wires are connected end-on to each other, it is common practice to remove the coating on the core wire tip portions so as to expose the naked optical fibers, and to then connect the two naked optical fibers together end-to-end. A known optical connector of this type is an optical connector in which, in order to maintain a state in which a short length of optical fiber that is already inserted into a ferrule and fixed therein (this may be referred to below simply as an 'integrated optical fiber') is placed end-to-end with an optical fiber that is inserted from the outside (this may be referred to below simply as an 'insertion optical fiber') and then connected thereto, a clamp portion that sandwiches the abutting end portions of the two optical fibers between two halves of a clamping component is provided in the rear part of the ferrule (see, for example, Japanese Unexamined Patent Application, First Publication No. 2005-208220).

SUMMARY

The present invention was made in view of the above-described circumstances, and it is an object thereof to provide an optical connector that facilitates the abutting of an end of an insertion optical fiber against an end of an integrated optical fiber.

In order to achieve the above-described object, the present invention provides an optical connector that includes: a ferrule within which an integrated optical fiber is fixed; a clamp portion disposed at a rear of the ferrule, the clamp portion comprising: a base component and a lid component facing the based component, where the base component and the lid component together are configured to clamp an end portion of the integrated optical fiber and an end portion of a naked optical fiber abutting the end portion of the integrated optical fiber; and a naked optical fiber guide portion disposed at a rear of the clamp, where the naked optical fiber guide portion comprises a through hole through which the naked optical fiber can be inserted, and that guides the naked optical fiber to the clamp portion by the through hole, where the base component comprises an alignment groove formed in a surface of the base component facing the lid component, where the alignment groove is aligned with the through hole of the naked optical fiber guide portion, such that the end portion of the naked optical fiber inserted into the through hole is guided by the through hole to the alignment groove to be aligned with the end portion of the integrated optical fiber, and where the through hole in the naked optical fiber guide portion is adjacent to a rear end of the alignment groove.

According to this optical connector, when an optical fiber is being inserted between a base component and a lid component towards a clamp portion in which a gap is formed, because a through hole through which the naked optical fiber can be inserted such that the naked optical fiber is prevented from lifting up from the alignment groove is provided directly in front of the alignment groove, it is possible to limit any axial misalignment between the optical fibers to a minimum, and to connect the naked optical fiber and the integrated optical fiber end-to-end with each other.

It is also possible for the optical connector to further include a tapered hole, disposed adjacent to a rear of the through hole where a cross-section of the tapered hole becomes gradually larger toward a rear of the tapered hole.

By employing such a structure, even if axial misalignment occurs between the through hole in the naked optical fiber guide portion and the alignment groove, the axial direction of the naked optical fiber can be corrected by the tapered hole so that the naked optical fiber can be guided to the alignment groove.

It is also possible for the optical connector where the through hole is a first through hole, to further include an insertion optical fiber guide portion, disposed at a rear of the naked optical fiber guide portion, where the insertion optical fiber guide portion includes a second through hole which is coaxial with the first through hole and which guides the insertion optical fiber towards the first through hole.

By employing such a structure, because the insertion direction of the portion of the insertion optical fiber which has the coating can be guided by the second through hole, the insertion direction of the naked optical fiber can be more precisely controlled when the naked optical fiber is being inserted into the through hole in the naked optical fiber guide portion.

It is also possible for the optical connector where the lid component is a first lid component to further include at a rear of the naked optical fiber guide portion, a second lid component configured to clamp the insertion optical fiber to the base component.

By employing such a structure, even if external force is applied to the insertion optical fiber after it is clamped by the second lid component, it is difficult for this force to be transmitted to the naked optical fiber and any harmful effects on the naked optical fiber that is inserted into the naked optical fiber through hole can be reduced.

It is also possible for the optical connector to further include an end surface protective film, including a refractive index matching gel, disposed on an end surface of the integrated optical fiber.

By employing such a structure, when the end-to-end portions of the naked optical fiber and the integrated optical fiber are held tight and clamped between the base component and the first lid component, by interposing the end surface protective film between the end surfaces of the two optical fibers, damage to the end surfaces of the two optical fibers can be reduced. Moreover, the end surfaces of the two optical fibers are able to easily slide against each other, so that even if axial misalignment occurs, it is possible to easily eliminate the misalignment by the clamp.

In order to achieve the above-described object, the present invention provides an optical connector that includes, a ferrule configured to fix an integrated optical fiber therewithin, a clamp portion disposed at a rear of the ferrule, the clamp portion including: a base component and a lid component, facing the base component, the base component and the lid component together configured to clamp an end of an insertion optical fiber to an end of the integrated optical fiber, where the base component includes a groove configured to position the end of the insertion optical fiber adjacent to the end of the integrated optical fiber, a guide portion including a through hole, adjacent to and aligned with the groove, where the through hole includes a first portion, adjacent to the groove, and a second portion, adjacent to a rear end of the first portion, where an inner circumference of the first portion is substantially constant and an inner circumference of the second portion is tapered and gradually increases from an end of the second portion adjacent to the first portion to a rear of the second portion.

The present invention provides an optical connector that facilitates the abutting of an end of an insertion optical fiber against an end of an integrated optical fiber.

DETAILED DESCRIPTION OF THE PREFERRED EMBODIMENTS

Hereinafter, the present invention will be described based on preferred embodiments thereof with reference made to the drawings.

Figure 1A:
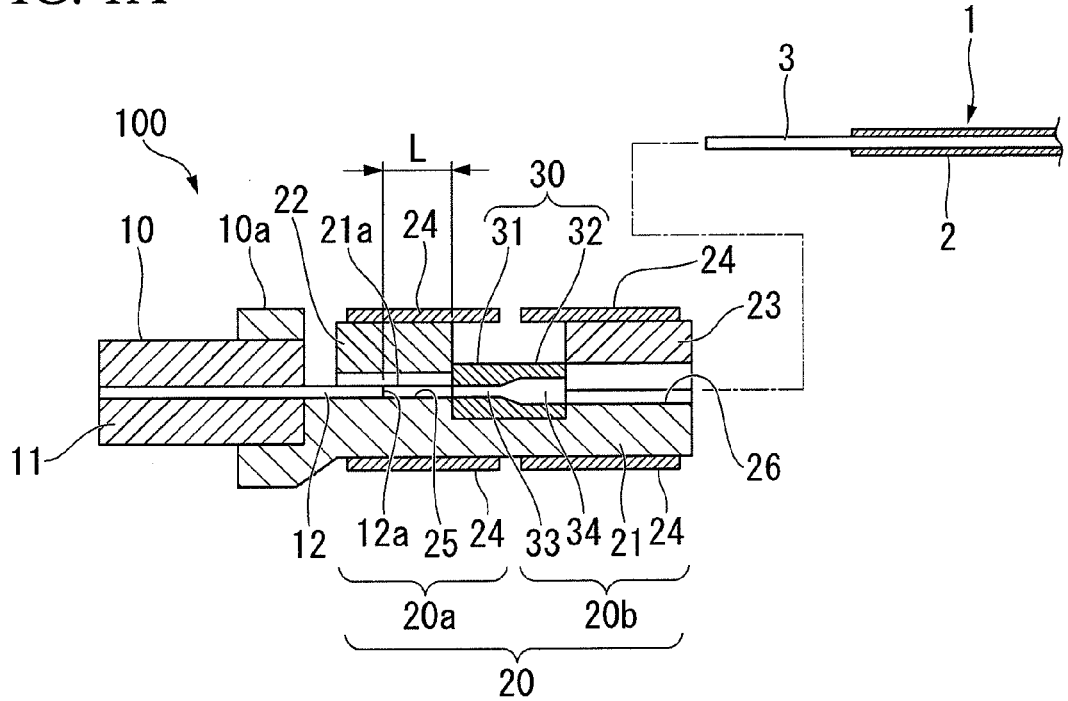
FIGS. 1A to 1C are cross-sectional views schematically illustrating a method of assembling an optical connector of the present invention.
Figure 1B:
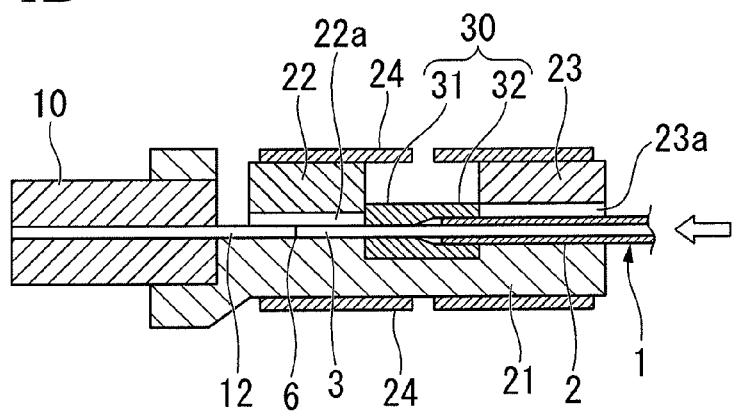
Figure 1C:
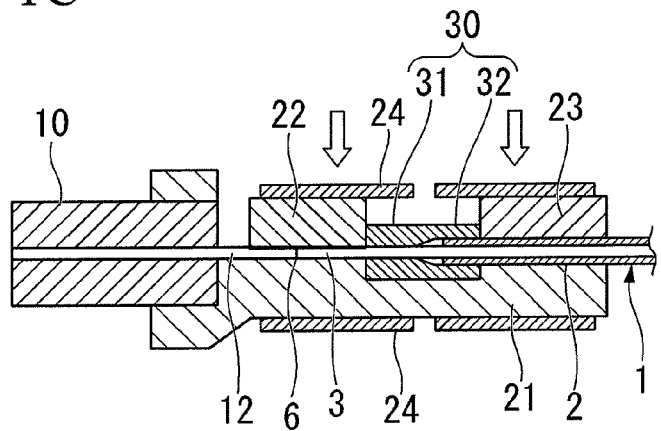

FIGS. 1A to 1C schematically show an optical connector of the present invention and a method of assembling the same.

An optical connector 100 shown in FIG. 1A is provided with a ferrule 10 into which an integrated optical fiber 12 is inserted and then fixed in position, a first clamp portion 20a that is located at the rear of the ferrule 10 and has a base component 21 and a first lid component 22 which mutually face each other, and that is able to clamp an end-to-end abutting portion 6 of the integrated optical fiber 12 and a naked optical fiber 3 at the tip of an insertion optical fiber 1 which is inserted from the rear into a gap between the base component 21 and the first lid component 22, and a naked optical fiber guide portion 31 that is located at the rear of the clamp portion 20a and guides the naked optical fiber 3 towards the first clamp portion 20a.

The naked optical fiber guide portion 31 has a naked optical fiber through hole 33 through which the naked optical fiber 3 is able to be inserted, and is able to guide the naked optical fiber 3 towards the first clamp portion 20a by the through hole 33. An aligning groove 25 that aligns the naked optical fiber 3 with the abutting portion 6 of the integrated optical fiber 12 is formed in a facing surface 21a of the base component 21 which faces the first lid component 22. Moreover, because the through hole 33 of the naked optical fiber guide portion 31 is continuous with the rear end of the aligning groove 25 of the base component 21, the tip portion of the naked optical fiber 3 is also guided to the aligning groove 25.

In the present specification, the side where the integrated optical fiber 12 is exposed in the longitudinal direction thereof to a bonding end surface 11 of the ferrule 10 (i.e., the left side in FIG. 1) is called the front, while the opposite side thereto (i.e., the right side in FIG. 1) is called the rear.

Figure 2A:
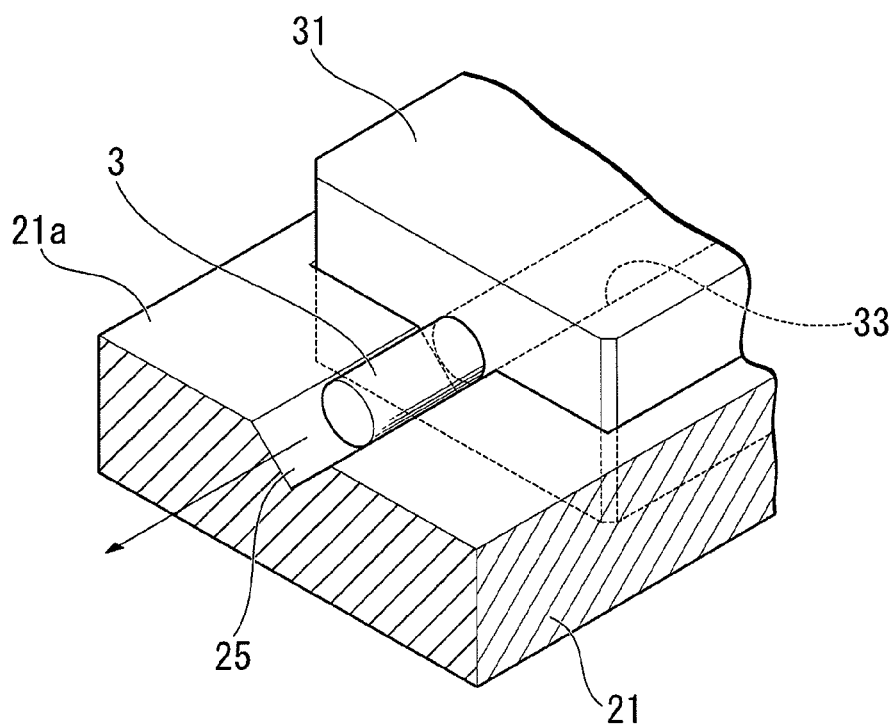
FIGS. 2A and 2B are perspective views illustrating an example of a relationship between an optical fiber hole and an optical fiber groove.

When the optical connector 100 shown in FIG. 1A is being assembled with the tip portion of the insertion optical fiber 1, as is shown in FIG. 1B, the insertion optical fiber 1 is inserted from the rear of the clamp portion 20 between the base component 21 and the first lid component 22. It is preferable for a coating 2 on the tip portion of the insertion optical fiber 1 to be removed so that the naked optical fiber 3 is exposed. When the naked optical fiber 3 at this tip portion is inserted into the naked optical fiber through hole 33 in the naked optical fiber guide portion 31, as is shown in FIG. 2A, because the naked optical fiber 3 can be guided in a straight line towards the alignment groove 25, the naked optical fiber 3 can be abutted end-to-end against the integrated optical fiber 12 within the alignment groove 25.

According to this optical connector 100, because the naked optical fiber through hole 33 that prevents the naked optical fiber 3 lifting up from the alignment groove 25 is provided directly in front of the alignment groove 25, even if there is a gap 22a between the base component 21 and the first lid component 22, it is possible to limit any axial misalignment between the two optical fibers 3 and 12 to a minimum, and to connect the naked optical fiber 3 and the integrated optical fiber 12 end-to-end with each other.

The base component 21 can have the alignment groove 25 that houses the naked optical fiber 3 and the integrated optical fiber 12 between the ferrule 10 and the optical fiber guide portion 30. The alignment groove 25 facilitate matching (i.e., aligning) the optical axes of the naked optical fiber 3 and the integrated optical fiber 12. A V-groove is preferable for the alignment groove 25.

In order to guide the forward movement of the insertion optical fiber 1, it is preferable for a coated optical fiber housing groove 26 that houses the insertion optical fiber 1 to be provided on the base component 21 to the rear of the optical fiber guide portion 30. There are no particular restrictions on the shape of the coated optical fiber housing groove 26 and examples thereof include a U-groove, a semicircular groove, and a V-groove.

As is shown in FIG. 1C, the abutting portion 6 between the naked optical fiber 3 and the integrated optical fiber 12 is held tight and clamped by the base component 21 and the first lid component 22 that are positioned facing each other between the ferrule 10 and the naked optical fiber guide portion 31, so that the end-to-end connection can be maintained.

If a problem occurs in the matching together of the two optical fibers 3 and 12 such as axial misalignment or the like, then the naked optical fiber 3 is able to be displaced by the urging force from a clamp spring 24 such that the optical axes of the two optical fibers 3 and 12 matches each other. A distance L from an end surface 12a of the integrated optical fiber 12 which is placed in the alignment groove 25 to the naked optical fiber guide portion 31 is a suitable length to make it difficult for the naked optical fiber 3 to lift up from the alignment groove 25, and is preferably, for example, 2 to 3 mm.

In addition, a second clamp portion 20b that clamps the insertion optical fiber 1 between the base component 21 and a second lid component 23 that are mutually facing each other is provided at the rear of the optical fiber guide portion 30. By sandwiching the coated insertion optical fiber 1 between the base component 21 and the second lid component 23, the insertion optical fiber 1 is fixed.

Figure 2B:
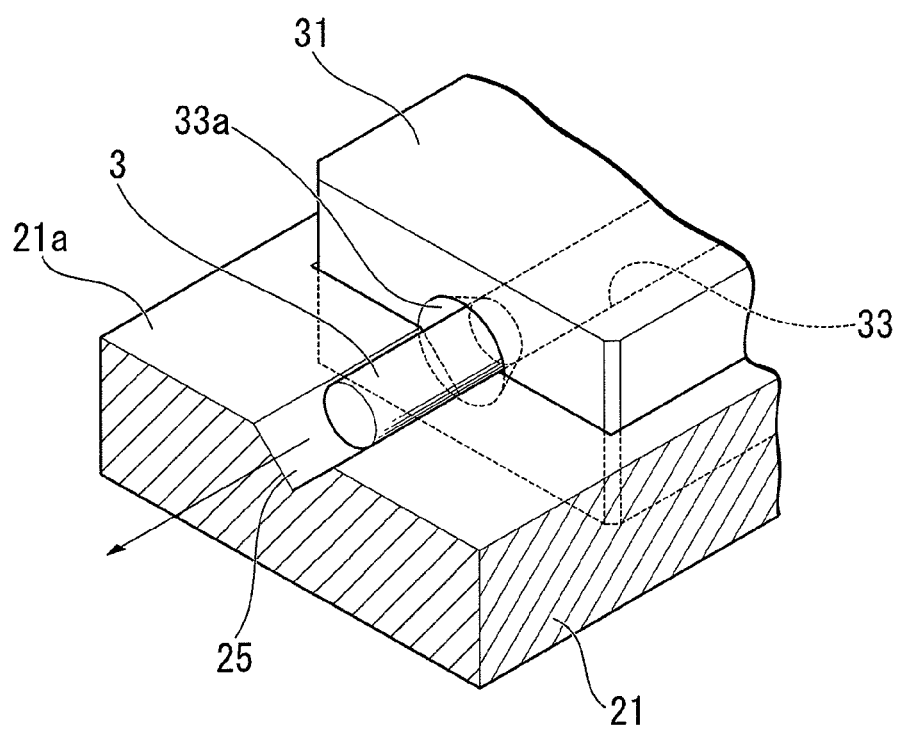

Moreover, as is shown in FIG. 2B, it is also possible for a tapered hole 33a whose cross-section becomes gradually larger as moving towards the alignment groove 25 to be provided at a circumferential edge of the aperture of the naked optical fiber through hole 33 that faces the alignment groove 25. By employing such a structure, even if axial misalignment occurs between the naked optical fiber through hole 33 and the alignment groove 25, the axial direction of the naked optical fiber 3 can be corrected by the tapered hole 33a so that the naked optical fiber 3 can be guided reliably to the alignment groove 25. It is preferable for the cross-section of the naked optical fiber through hole 33 to be circular. It is also preferable for the inner diameter of the naked optical fiber through hole 33 to be approximately the same as the outer diameter of the naked optical fiber 3. It is also possible for the maximum diameter of the tapered hole 33a to be greater than the width of the alignment groove 25.

Figure 3A:
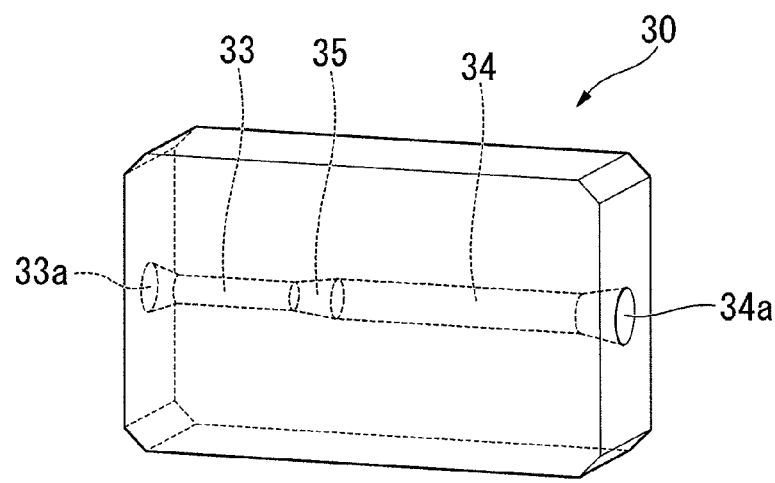
FIG. 3A is a perspective view showing an example of an optical fiber guide component.
Figure 3B:
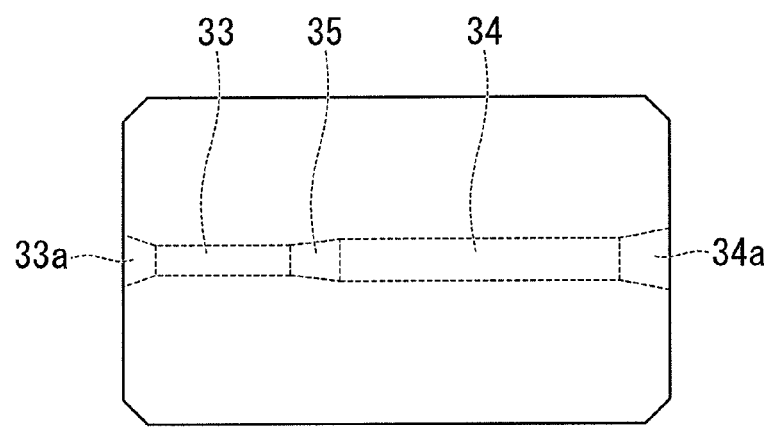
FIG. 3B is a plan view showing an example of an optical fiber guide component.
Figure 3C:
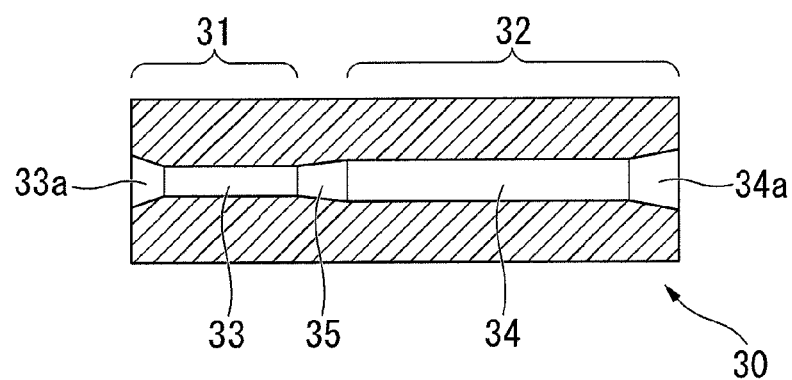
FIG. 3C is a cross-sectional view showing an example of an optical fiber guide component.

Moreover, as is shown in FIG. 1 and FIG. 3, it is also possible to provide an insertion optical fiber guide portion 32 that is coaxial with the naked optical fiber through hole 33 and has an insertion optical fiber through hole 34 which guides the portion of the insertion optical fiber 1 having the coating 2 towards the naked optical fiber through hole 33. By employing such a structure, because the insertion direction of the portion of the insertion optical fiber 1 having the coating 2 is guided by the insertion optical fiber through hole 34, the insertion direction of the naked optical fiber 3 can be more precisely controlled when the naked optical fiber 3 is being inserted into the naked optical fiber through hole 33. It is preferable for the cross-section of the insertion optical fiber through hole 34 to be circular. It is also preferable for the inner diameter of the insertion optical fiber through hole 34 to be approximately the same as the outer diameter of the portion of the insertion optical fiber 1 having the coating 2.

It is also possible for a tapered hole 34a whose cross-section becomes gradually larger as moving towards the rear to be provided at a rear end of the insertion optical fiber through hole 34. By employing such a structure, the insertion of the insertion optical fiber 1 into the insertion optical fiber through hole 34 is made easier.

As is shown in FIG. 3, it is possible for the naked optical fiber guide portion 31 and the insertion optical fiber guide portion 32 to be structured as an integrated optical fiber guide portion 30. This type of structure is preferable as it simplifies the task of aligning the axes of the naked optical fiber through hole 33 and the insertion optical fiber through hole 34 on the same axis. The structure formed between the naked optical fiber through hole 33 and the insertion optical fiber through hole 34 is not particularly restricted, and it is possible, for example, for a tapered portion 35 to be provided whose inner diameter becomes gradually narrower as moving from the insertion optical fiber through hole 34 towards the naked optical fiber through hole 33.

The optical connector 100 can include a second lid component 23 at the rear of the naked optical fiber guide portion 31. A second clamp portion 20b that clamps the portion of the insertion optical fiber 1 with the coating 2 between itself and the base component 21 is formed by the base component 21 and the second lid component 23 which are mutually facing each other. If the insertion optical fiber 1 is clamped in the second clamp portion 20b, then even if external force is applied to the insertion optical fiber 1 after it is clamped, it is difficult for this force to be transmitted to the naked optical fiber 3 and any harmful effects on the naked optical fiber 3 that is inserted into the naked optical fiber through hole 33 can be reduced. A gap 23a that enables the insertion optical fiber 1 to pass easily before the clamping is secured between the base component 21 and the second lid component 23. After the clamping, the gap 23a is closed so that the insertion optical fiber 1 is clamped between the base component 21 and the second lid component 23 by the urging force from the clamp spring 24.

Figure 4A:
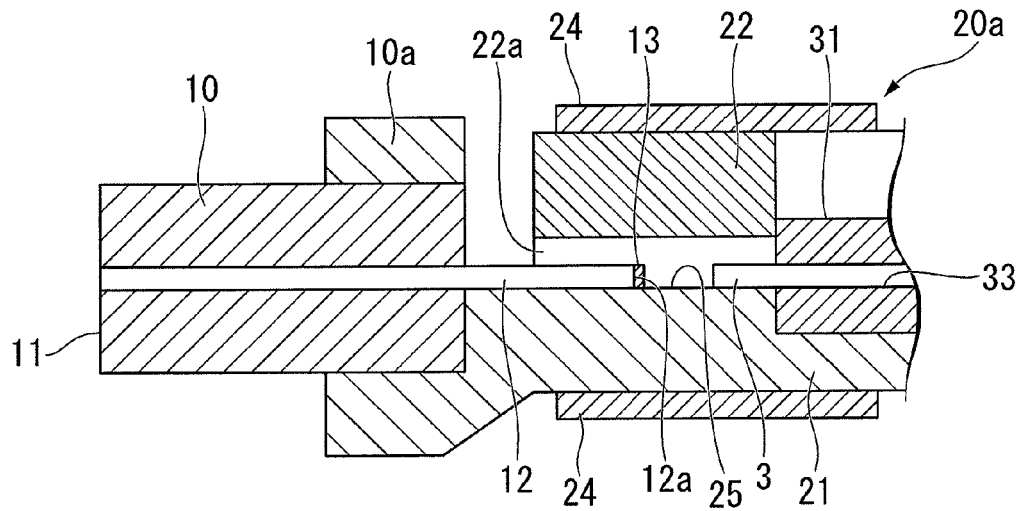
FIGS. 4A to 4C are cross-sectional views illustrating a method of assembling an optical connector when a gel matching agent is provided at a rear end of an integrated optical fiber.
Figure 4B:
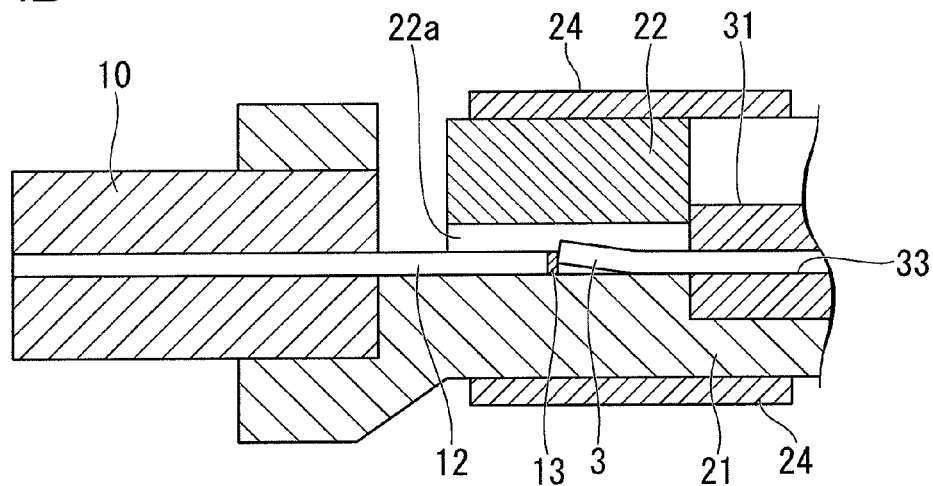
Figure 4C:
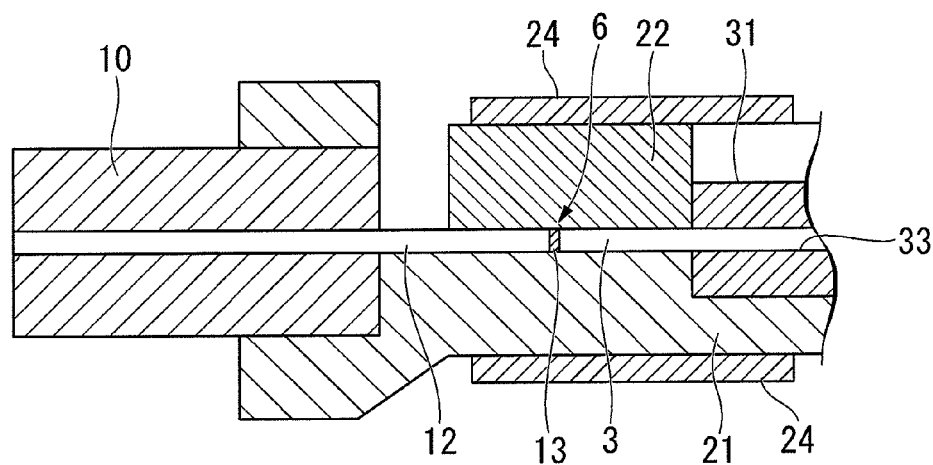

As is shown in FIG. 4, it is also possible to provide an end surface protective film 13 that is formed by a refractive index matching gel on an end surface 12a of the integrated optical fiber 12 that is laid in the alignment groove 25 and protrudes from the ferrule 10. If the end surface protective film 13 is interposed between the two end surfaces of the two optical fibers 3 and 12 on the abutting portion 6 between the two optical fibers 3 and 12, then damage to the end surfaces of the two optical fibers 3 and 12 can be reduced. Moreover, because the end surfaces of the two optical fibers are able to easily slide against each other, as is shown in FIG. 4B, even if axial misalignment does occur before the clamping between the naked optical fiber 3 and the integrated optical fiber 12, as is shown in FIG. 4C, by clamping the abutting portion 6 between the naked optical fiber 3 and the integrated optical fiber 12 between the base component 21 and the first lid component 22, it is possible to easily eliminate any axial misalignment.

Note that in FIG. 4B, in order to make the explanation easier to understand, the amount of lifting of the naked optical fiber 3 and the size of the axial misalignment are exaggerated beyond the size of the actual axial misalignment.

Because the end surface protective film 13 is formed by a refractive index matching gel, optical signals transmitted between the two optical fibers 3 and 12 are able to pass through it.

The ferrule 10 is not particularly restricted and ferrules made, for example, from ceramics such as zirconia, or from a hard material such as glass can be used. It is also possible for a ferrule molded partly or wholly from a synthetic resin to be used for the ferrule 10.

The ferrule 10 is provided with a micro hole that penetrates it in an axial direction from the bonding end surface 11. The integrated optical fiber 12 is packaged inside this micro hole and is fixed in position by an adhesive agent or the like.

The present invention has been described above based on an optimum embodiment thereof, however, the present invention is not limited to the above-described embodiment and various modifications may be made thereto insofar as they do not depart from the spirit or scope of the present invention.

For example, the specific structure of the optical connector is not particularly restricted provided that it is compatible with the technical ideas of the present invention. The specific procedure for assembling the optical connector may also be modified in accordance with the specific structure of the optical connector.

Examples of the insertion optical fiber 1 include optical fiber core wires and optical fiber elements wires. It is also possible to use an optical fiber cable that has an external coating for the outer circumference of the insertion optical fiber 1. Examples of the optical fiber cable include an indoor cable, a drop cable and the like.

The naked optical fiber 3 may be, for example, a quartz-based optical fiber. Moreover, the coating 2 is a resin coating that is formed, for example, by substantially concentrically coating either one or a plurality of layers of a UV curable resin or polyamide resin or the like.

Figure 5:
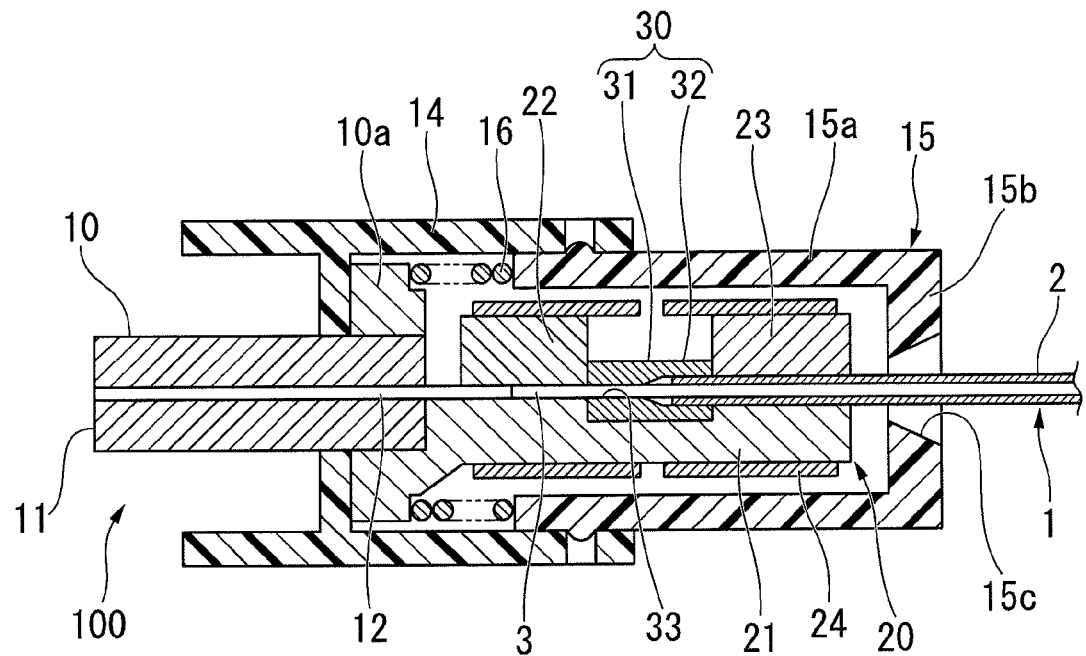
FIG. 5 is a cross-sectional view showing an example in which a housing is provided on an optical connector.
Figure 6:
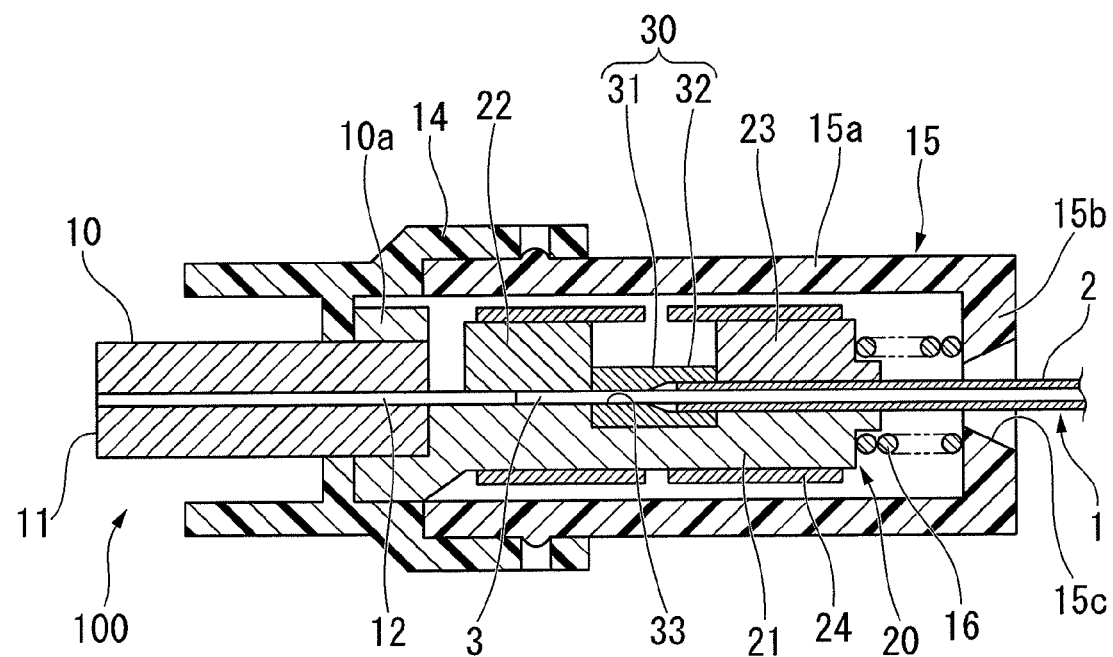
FIG. 6 is a cross-sectional view showing an example in which a housing is provided on an optical connector.

FIG. 5 and FIG. 6 show examples in which a housing is provided on the optical connector of the present invention. The housing on these connectors includes at least a front-side housing 14 and a rear-side housing 15, and the clamp portion 20 is housed inside this housing.

An aperture portion 15c through which the insertion optical fiber 1 is inserted is provided in a rear end portion 15b of the rear-side housing 15. It is preferable for this aperture portion 15c to have a tapered hole whose diameter becomes gradually smaller as moving towards the interior in order to facilitate the insertion of the insertion optical fiber 1 into the clamp portion 20. In the case shown in FIG. 5, a spring 16 applies urging force to a flange portion 10a that is used to mount the ferrule 10 on the base component 21 so as to urge the ferrule 10 towards the front. In the case shown in FIG. 6, the spring 16 applies urging force to the rear end of the clamp portion 20 so as to urge the ferrule 10 towards the front.

Figure 7:
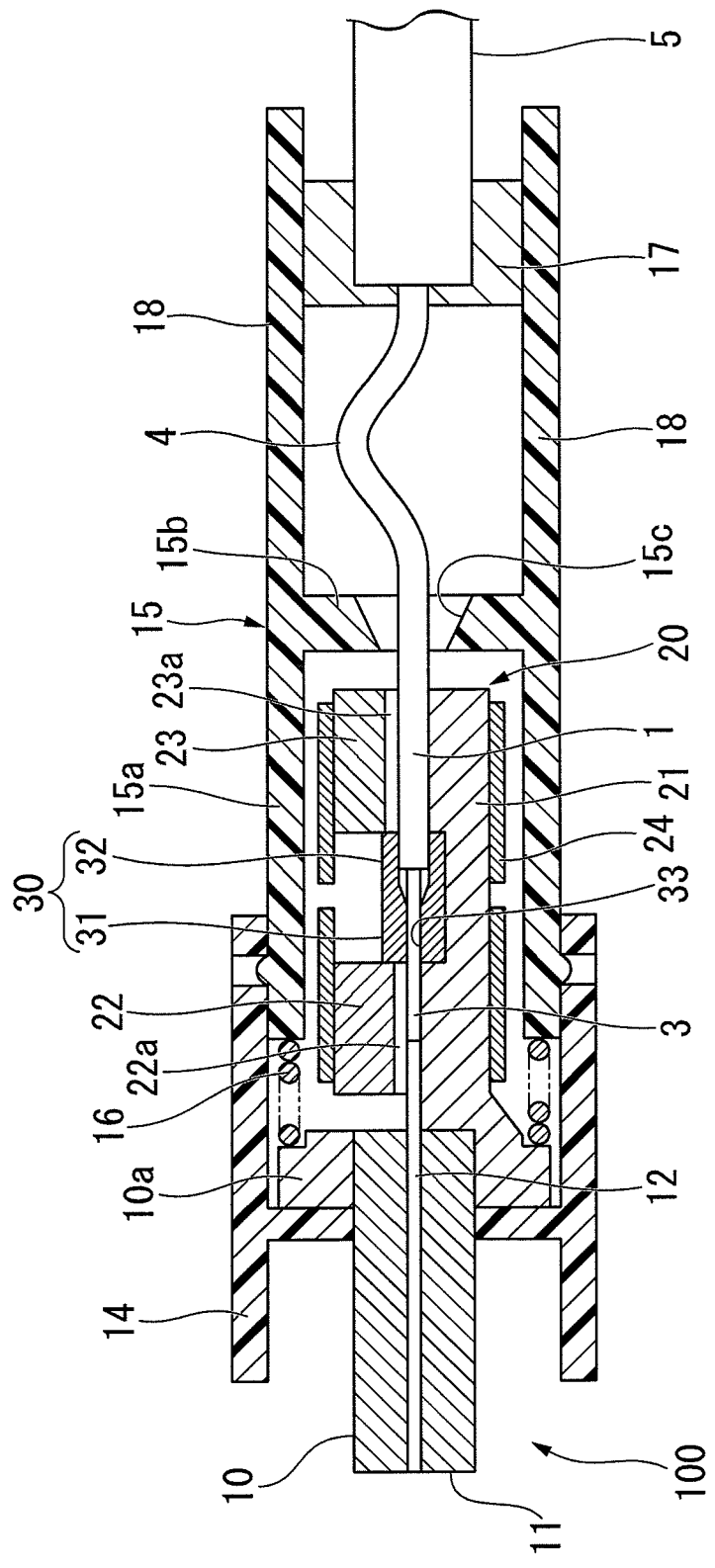
FIG. 7 is a cross-sectional view showing an example of an optical connector that allows a deflection to be formed in the optical fiber at the rear of a clamp portion.

FIG. 7 shows an example of an optical connector that allows a deflection 4 to be formed in the insertion optical fiber 1 at the rear of the clamp portion 20. This optical connector is provided with an optical fiber holder 17 that holds an optical fiber cable 5, and a joint portion 18 that extends towards the rear from the rear end portion 15b of the housing 15 and joins the optical fiber holder 17. By integrating the optical fiber holder 17 with the optical connector 100 while guiding the optical fiber holder 17 by the joint portion 18, it is possible to guide the direction in which the insertion optical fiber 1 is inserted into the gaps 22a and 23a between the base component 21 and the first lid component 22 and second lid component 23. Moreover, when the naked optical fiber 3 is struck the insertion optical fiber 12, the deflection 4 is formed between the clamp portion 20 and the optical fiber holder 17 due to the elasticity of the insertion optical fiber 1, so that it is possible to guarantee sufficient pressing force to achieve an end-to-end connection between the end surfaces of the naked optical fiber 3 and the integrated optical fiber 12.

After the clamping, the optical fiber holder 17 may be pulled back further towards the rear along the joint portion 18 (i.e., towards the right in FIG. 7) so as to lessen the deflection in the insertion optical fiber 1. By doing this, it is possible to limit the bending loss of the insertion optical fiber 1 to a tolerance range that is suitable for optical transmissions. It is also possible for the joint portion 18 to be in the form of a rail so that the optical fiber holder 17 is able to move forwards and backwards.

The clamp portion 20 is formed by the narrow, elongated base component 21, the first lid component 22 and the second lid component 23 that are positioned next to each other in the axial direction and face the base component 21, and the clamp spring 24 that imparts urging force to the components 21, 22, and 23. The clamp portion 20 is housed within a cylindrical portion 15a of the rear-side housing 15. In order to secure the gap 22a between the base component 21 and the first lid component 22 and the gap 23a between the base component 21 and the second lid component 23 prior to the clamping, wedge-shaped components (not shown) are interposed between the base component 21 and the first lid component 22 and between the base component 21 and the second lid component 23. When these wedge-shaped components are extracted, the gap between the base component 21 and the first lid component 22 and the gap between the base component 21 and the second lid component 23 are closed, and the clamping force of the clamp spring 24 is able to maintain this closed state.

The alignment groove 25 that fixes and aligns the positions of the naked optical fiber 3 and the integrated optical fiber 12 is formed as an alignment mechanism in the join surface of the clamp portion 20 where the base component 21 and the first lid component 22 are mutually superimposed. An alignment groove 25 is provided for each pair of a naked optical fiber 3 and an integrated optical fiber 12 (here, the number of cores is 1) that are to be connected together. In the present embodiment, the alignment groove 25 is provided in the facing surface 21a of the base component 21 that faces the first lid component 22.

The coated optical fiber housing groove 26 is provided on an extension of the alignment groove 25 in the join surface where the base component 21 and the second lid component 23 are mutually superimposed. This coated optical fiber housing groove 26 extends further to the rear from the position where the join surfaces where the base component 21 and the second lid component 23 are mutually superimposed are located exactly opposite each other. The coated optical fiber housing groove 26 houses the tip portion of that portion of the insertion optical fiber 1 with coating, and has a shape that, when the second lid component 23 is clamped by the clamp spring 24, enables the insertion optical fiber 1 to be firmly fixed by this clamping. In the present embodiment, the coated optical fiber housing groove 26 is provided on the facing surface of the base component 21 that faces the second lid component 23.

Figure 8A:
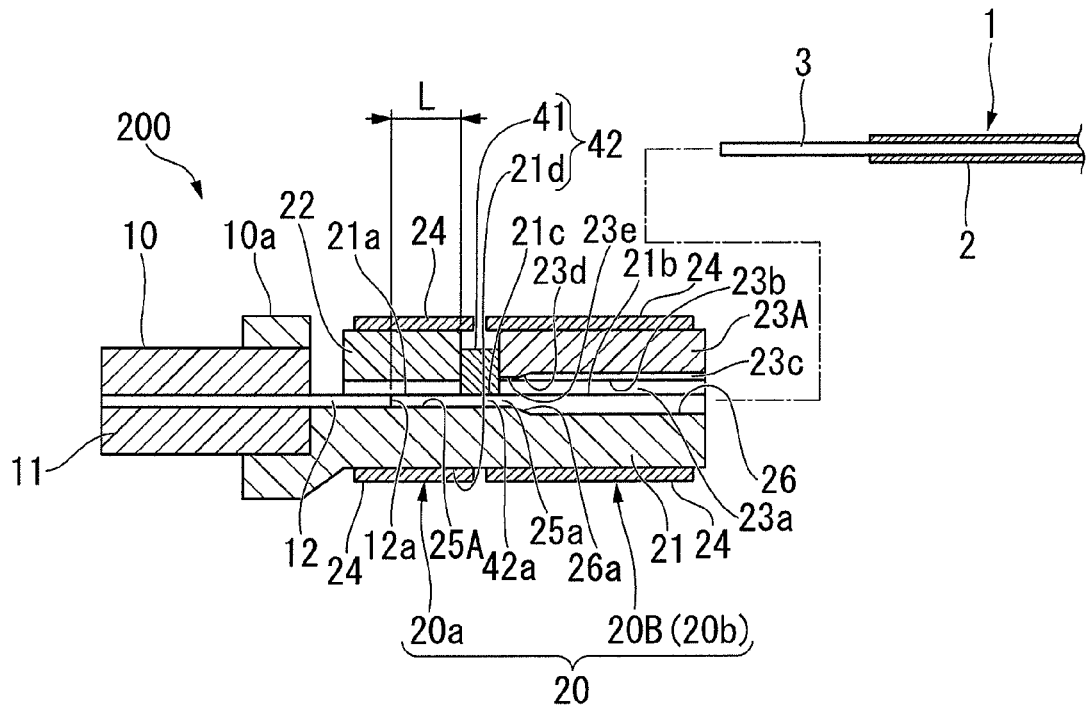
FIGS. 8A and 8B are cross-sectional views illustrating an overview of an optical connector of a first embodiment according to the present invention.
Figure 8B:
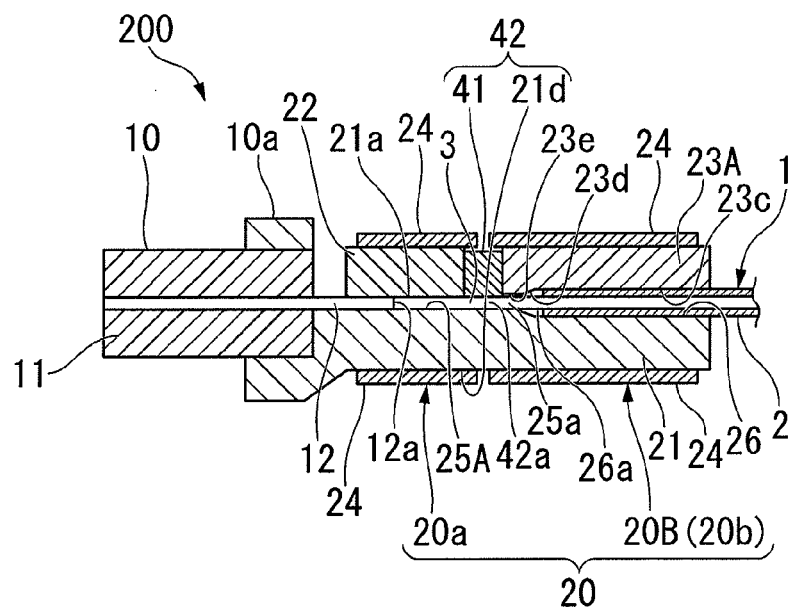

FIGS. 8A and 8B show an optical connector 200 in which a naked optical fiber pressing component 41 is fixed to the base component 21 of the above-described optical connector 100, instead of the optical fiber guide portion 30.

In the base component 21 of the optical connector 200 shown in FIGS. 8A and 8B, an alignment groove 25A is formed, which is obtained by extending the alignment groove 25 of the base component 21 of the optical connector 100 described with reference to FIGS. 1A to 1C, and the like, from the facing surface 21a to its rear side (hereinafter, referred to as a first facing surface) that faces the first lid component 22 of the base component 21. An intermediate surface 21c is formed between the first facing surface 21a of the base component 21 and a second facing surface 21b that faces the second lid component 23. The alignment groove 25A is formed extending from the first facing surface 21a to the second facing surface 21b via the intermediate surface 21c. The alignment groove 25A is provided with a rear end portion 25a formed in the second facing surface 21b.

As shown in FIGS. 8A and 8B, the naked optical fiber pressing component 41 is disposed in the rear side of the first lid component 22, being fixed to the intermediate surface 21c of the base component 21.

Figure 9:
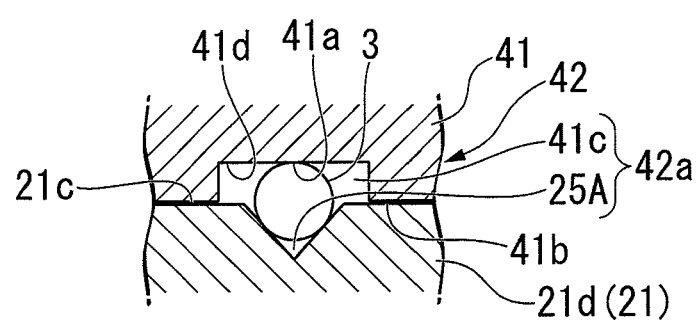
FIG. 9 shows a configuration example of the vicinity of the naked optical fiber through hole of the naked optical fiber guide portion of the optical connector shown in FIGS. 8A and 8B.

The naked optical fiber pressing component 41 is firmly adhered due to application of an adhesive agent to both sides thereof via the alignment groove 25A of the intermediate surface 21c of the base component 21 (refer to FIG. 9 for an example thereof). However, a method of fixing the naked optical fiber pressing component 41 to the base component 21 (fixing method) is not particularly limited, and mechanical fixing and the like of fitting fixing or screwing of the base component 21 of the naked optical fiber pressing component 41, is also applicable.

A naked optical fiber through hole 42a through which the naked optical fiber 3 can penetrate is ensured between the naked optical fiber pressing component 41 and the inner surface facing the naked optical fiber pressing component 41 of the alignment groove 25A. The naked optical fiber pressing component 41 and a base intermediate portion 21*d* positioned between the first facing surface 21*a* and the second facing surface 21*b* disposed in the front and rear directions of the base component 21 constitute a naked optical fiber guide portion 42 (optical fiber guide portion) that guides the naked optical fiber 3 that is inserted into the naked optical fiber through hole 42*a* toward the first clamp portion 20*a*.

The naked optical fiber pressing component 41 presses the naked optical fiber 3 that is inserted into the naked optical fiber through hole 42*a* so that the naked optical fiber 3 would not lift up from the alignment groove 25A, using a portion disposed to face the alignment groove 25A. The naked optical fiber guide portion 42 can guide the naked optical fiber 3, which is inserted into the naked optical fiber through hole 42*a* from the rear side, straight toward the forward integrated optical fiber 12 from the naked optical fiber through hole 42*a* along the alignment groove 25A. Moreover, the naked optical fiber guide portion 42 prevents the naked optical fiber 3 from lifting up from the alignment groove 25A, disposed in the portion positioned in the front side of the naked optical fiber through hole 42*a* of the alignment groove 25A.

Therefore, in the optical connector 200, even if there is a gap 22*a* between the base component 21 and the first lid component 22, it is possible to limit any axial misalignment between both optical fibers 3 and 12 to a minimum level, and to connect the naked optical fiber 3 and the integrated optical fiber 12 end-to-end with each other.

FIG. 9 schematically shows an example of a structure of the periphery of the naked optical fiber through hole 42*a* of the naked optical fiber guide portion 42. FIG. 9 shows an enlarged structure of the periphery of the naked optical fiber through hole 42*a* of the naked optical fiber guide portion 42 from the rear side.

The naked optical fiber through hole 42*a* of the naked optical fiber guide portion 42 shown in FIG. 9 is formed by the alignment groove 25A of the base component 21 and a naked optical fiber housing groove 41*c* in an angular groove shape which is formed in a bottom surface 41*b* of the naked optical fiber pressing component 41 that faces the base component 21 extending along the alignment groove 25A.

The naked optical fiber housing groove 41*c* shown in FIG. 9 is an angular groove with a groove width that is slightly greater than that of the alignment groove 25A. The naked optical fiber housing groove 41*c* shown in the drawing is formed such that the center thereof in the groove width direction is aligned with that of the alignment groove 25A in the groove width direction.

The naked optical fiber through hole 42*a* shown in FIG. 9 houses a portion of the naked optical fiber 3 projecting on the intermediate surface 21*c* of the base component and being disposed along the alignment groove 25A in the naked optical fiber housing groove 41*c*. In addition, the naked optical fiber housing groove 41*c* shown in the drawing has a groove bottom face 41*d*, which is orthogonal to the depth direction, serving as a fiber pressing face for pressing the naked optical fiber 3 toward the alignment groove 25A so as not to lift up from the alignment groove 25A. The groove bottom face 41*d* of the naked optical fiber housing groove 41*c* has a portion facing the alignment groove 25A in the center of the groove width of the naked optical fiber housing groove 41*c*, and the portion is designed to serve as a fiber pressing face 41*a*.

As shown in FIGS. 8A and 8B, in a facing surface 23*b* of the second lid component 23 (lid facing surface) facing the base component 21 of the optical connector 200, a coated optical fiber housing groove 23*c* (lid-side coated optical fiber housing groove) is formed, which guides the portion of the insertion optical fiber 1 with the coating 2 that is inserted between the base component 21 and the second lid component 23 from the rear side of the connector. The coated optical fiber housing groove 23*c* is formed at the position where the facing surface 23*b* of the second lid component 23 faces the coated optical fiber housing groove 26 of the base component 21. The reference numeral 23A in the drawings is given to the second lid component 23 of the optical connector 200.

On the facing surface 23*b* of the second lid component 23A, a tapered groove portion 23*d* is formed, the groove width of which reduces along the front end of the coated optical fiber housing groove 23*c* in the lid side towards the front side and the depth of which from the facing surface 23*b* becomes shallower.

Also on the second facing surface 21*b* of the base component 21, a tapered groove portion 26*a* is formed to be tapered at a position corresponding to the tapered groove portion 23*d* of the second lid component 23A. The tapered groove portion 26*a* of the base component 21 is formed to be tapered such that the groove width thereof reduces along the front end of the coated optical fiber housing groove 26 to the front side of the connector and the depth thereof from the second facing surface 21*b* becomes shallow. In addition, the coated optical fiber housing groove 26 of the base component 21 is connected to the rear end of the alignment groove 25A via the tapered groove portion 26*a*.

In addition, on the facing surface 23*b* of the second lid component 23A, a front end groove 23*e* is formed, which extends from the front end of the tapered groove portion 23*d* to the front side of the connector and reaches the front end surface of the second lid component 23A. The front end groove 23*e* is formed at a position facing the rear end portion 25*a* of the alignment groove of the base component 21. In addition, the front end groove 23*e* is formed to allow the naked optical fiber 3 to be inserted therethrough via the tapered groove portion 23*d* from the rear side of the tapered groove portion 23*d*.

The second clamp portion 20*b* (to which the reference numeral 20B is given in the drawings) in the rear side of the naked optical fiber pressing component 41 of the optical connector 200 can guide the portion of the insertion optical fiber 1 with the coating 2 that is inserted between the base component 21 and the second lid component 23A from the rear side of the connector via the coated optical fiber housing grooves 26 and 23*c*, when the gap 23*a* is secured between the facing surfaces 21*a* and 23*b* of the base component 21 and the second lid component 23A. In addition, the second clap portion 20B can easily perform insertion of the naked optical fiber 3 at the distal end of the insertion optical fiber 1 to the naked optical fiber through hole 42*a* of the naked optical fiber guide portion 42 through the tapered groove portions 26*a* and 23*d* of the base component 21 and the second lid component 23A.

In order to smoothly insert the naked optical fiber 3 into the naked optical fiber through hole 42*a* from the rear side of the naked optical fiber pressing component 41, for example, it is possible for the structure to appropriately employ a tapered surface of which the rear end portion of the fiber pressing surface becomes more separated from the intermediate surface 21*c* of the base component 21 as the portion continues towards the rear side.

As shown in FIG. 8B, the second clamp portion 20B can fixedly hold the portion of the insertion optical fiber 1 with the coating 2 tucked between the inner surface of the coated optical fiber housing groove 26 of the base component 21 and the inner surface of the coated optical fiber housing groove 23c of the second lid component 23A by the urging force from the clamp spring 24.

The structure and configuration of the clamp portion are not particularly restricted provided that the clamp portion is able to align the optical fibers and hold them in place via a clamp while the two end surfaces thereof are connected together end-to-end. For example, the number of lids facing the base of the element may be either one or more than one.

The present invention can also be applied to optical connectors in which a plurality of integrated optical fibers is integrated within a ferrule. In this case, if the number of alignment mechanisms, such as the positioning groove that is provided in the clamp portion, is at least the same as the number of integrated optical fibers, then it is possible for each of the optical fibers that are terminated with this optical connector to be optically connected with an integrated optical fiber via the alignment mechanism.

What is claimed is:

1. An optical connector comprising:
    a ferrule within which an integrated optical fiber is fixed;
    a clamp portion disposed at a rear of the ferrule, the clamp portion comprising:
        a first lid component;
        a second lid component; and
        a base component comprising a first facing surface which faces the first lid component and a second facing surface which is disposed at a rear of the first lid component and faces the second lid component;
    wherein the clamp portion is configured to clamp an abutting portion of a naked optical fiber at an end of an inserted optical fiber inserted from a rear of the clamp portion and the integrated optical fiber between the base component and the first lid component; and
    wherein the clamp portion is further configured to clamp a portion of the inserted optical fiber having a coating between the base component and the second lid component; and
    a naked optical fiber guide portion disposed between the first facing surface and the second facing surface on the base component, and having a first through hole through which the naked optical fiber can be inserted, a second through hole which guides the portion of the inserted optical fiber having a coating toward the first through hole, and a tapered portion disposed between the first through hole and the second through hole so as to be continuous and coaxial with the first through hole and the second through hole and the tapered portion having a cross-section which becomes gradually smaller from the second through hole toward the first through hole,
    wherein the base component comprises an alignment groove formed in the first facing surface of the base component thereby aligning the abutting portion of the naked optical fiber and the integrated optical fiber, and the first through hole of the naked optical fiber guide portion continues to a rear end of the alignment groove, and
    wherein the naked optical fiber is guided by the first through hole to the alignment groove of the base component.

2. The optical connector according to claim 1, further comprising, at a circumferential edge of an aperture of the first through hole that faces the alignment groove, a tapered hole, wherein a cross-section of the tapered hole becomes gradually larger as moving towards the alignment groove.

3. The optical connector according to claim 1, further comprising an end surface protective film, comprising a refractive index matching gel, disposed on an end surface of the integrated optical fiber disposed in the alignment groove of the base component.

4. The optical connector according to claim 1, further comprising:
    a flange portion that mounts the ferrule on the base component; and
    a spring that applies an urging force to the flange portion and urges the ferrule towards a front.

5. The optical connector according to claim 1, further comprising:
    a flange portion that mounts the ferrule on the base component; and
    a spring that applies an urging force to the flange portion and urges the ferrule towards a front.

6. The optical connector according to claim 1, further comprising an optical fiber holder that holds the optical fiber cable that has an external coating on the outer circumference of the insertion optical fiber.

* * * * *